(12) United States Patent
Zhang et al.

(10) Patent No.: US 11,939,238 B2
(45) Date of Patent: Mar. 26, 2024

(54) APPARATUS AND METHOD FOR HYDRATE-BASED WASTEWATER TREATMENT AND COLD STORAGE

(71) Applicant: DALIAN UNIVERSITY OF TECHNOLOGY, Liaoning (CN)

(72) Inventors: Lunxiang Zhang, Liaoning (CN); Yongchen Song, Liaoning (CN); Xiaodong Wu, Liaoning (CN); Jiazhu Bao, Liaoning (CN); Chuanxiao Cheng, Liaoning (CN); Zheng Ling, Liaoning (CN); Jie Wang, Liaoning (CN); Fan Wang, Liaoning (CN); Yu Liu, Liaoning (CN); Lei Yang, Liaoning (CN); Mingjun Yang, Liaoning (CN); Yanghui Li, Liaoning (CN); Peng Wu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/317,098

(22) Filed: May 15, 2023

(65) Prior Publication Data
US 2023/0365431 A1    Nov. 16, 2023

(30) Foreign Application Priority Data
May 16, 2022  (CN) .......................... 202210528011.1

(51) Int. Cl.
*C02F 1/04*   (2023.01)
*C02F 1/00*   (2023.01)
*C02F 1/68*   (2023.01)

(52) U.S. Cl.
CPC .............. *C02F 1/048* (2013.01); *C02F 1/002* (2013.01); *C02F 1/683* (2013.01)

(58) Field of Classification Search
CPC ........... C02F 1/048; C02F 1/002; C02F 1/683
See application file for complete search history.

(56) References Cited

U.S. PATENT DOCUMENTS 3,170,870 A * 2/1965 Bachman .................. C02F 1/26
                                                  62/545
6,497,794 B1 * 12/2002 Max .......................... C02F 1/20
                                                  210/765

(Continued)

*Primary Examiner* — Jonathan Miller
(74) *Attorney, Agent, or Firm* — JCIPRNET (57) ABSTRACT

The present disclosure provides an apparatus and a method for hydrate-based wastewater treatment and cold storage. The apparatus for hydrate-based wastewater treatment and cold storage includes a water chilling unit, a hydrate-based cold storage tank, an airflow disturbance device, a water layer positioning system, a spraying system, a suction filtration system, a heat exchange system, and a system monitoring device. The water chilling unit provides a secondary refrigerant at a low temperature. The secondary refrigerant flows through an evaporator coil in the hydrate-based cold storage tank for heat exchange. The airflow disturbance device induces hydrate nucleation. The water layer positioning system positions a contact surface between a water layer and a hydrate former after hydrate decomposition to facilitate drawing and separation of the treated upper water layer. The spraying system and the suction filtration system enhance the solid-liquid separation efficiency to improve the removal rate of pollutants.

9 Claims, 3 Drawing Sheets

(56) References Cited

U.S. PATENT DOCUMENTS

| | | | |
|---|---|---|---|
| 7,008,544 B2* | 3/2006 | Max | C02F 1/22 |
| | | | 210/708 |
| 7,255,794 B2* | 8/2007 | Max | B01D 53/62 |
| | | | 210/906 |
| 7,569,737 B2* | 8/2009 | Phelps | C02F 1/22 |
| | | | 210/711 |
| 7,608,171 B2* | 10/2009 | Otukol | B01D 1/22 |
| | | | 202/172 |
| 9,643,866 B2* | 5/2017 | Lee | C02F 1/683 |
| 9,993,826 B2* | 6/2018 | Lee | B01L 7/54 |
| 2002/0003111 A1* | 1/2002 | Max | C02F 1/20 |
| | | | 210/703 |
| 2002/0155047 A1* | 10/2002 | Max | C02F 1/265 |
| | | | 422/245.1 |
| 2003/0024803 A1* | 2/2003 | Max | C02F 1/22 |
| | | | 203/10 |
| 2007/0004945 A1* | 1/2007 | Phelps | C02F 1/265 |
| | | | 585/15 |
| 2007/0108037 A1* | 5/2007 | Otukol | B01D 1/22 |
| | | | 203/1 |
| 2011/0233147 A1* | 9/2011 | Hayafuji | C02F 1/26 |
| | | | 210/205 |
| 2015/0232354 A1* | 8/2015 | Lee | C02F 1/683 |
| | | | 210/750 |
| 2017/0304841 A1* | 10/2017 | Lee | B02C 19/0018 |
| 2020/0377382 A1* | 12/2020 | Mahajan | C02F 1/265 |

* cited by examiner

APPARATUS AND METHOD FOR HYDRATE-BASED WASTEWATER TREATMENT AND COLD STORAGE

CROSS-REFERENCE TO RELATED APPLICATION

This application claims the priority benefit of China application serial no. 202210528011.1, filed on May 16, 2022. The entirety of the above-mentioned patent application is hereby incorporated by reference herein and made a part of this specification.

TECHNICAL FIELD

The present disclosure relates to the fields of hydrate-based wastewater treatment and hydrate-based cold storage, and specifically to a system for wastewater treatment and cold storage which can perform wastewater treatment by solid-liquid phase change of a hydrate and perform cold energy collection and cold storage by using the hydrate formed.

BACKGROUND

With the rapid development of industry, there are more diversified pollution sources of wastewater, and the composition of wastewater becomes more complex and unknown. Conventional wastewater treatment technologies have the problems such as poor effect and increased energy consumption for the treatment of complex wastewater systems. With a hydrate-based wastewater treatment system, a hydrate can be correspondingly formed at a relatively high temperature and atmospheric pressure by using a respective hydrate former, so as to separate purified water from impurities in the wastewater. Such a technology has low requirements on the treatment conditions, and the technology does not cause secondary pollution, and has no selectivity to the types of pollutants. In addition, the system uses the hydrate for cold storage, overcoming the disadvantages of conventional cold storage systems, such as low cold storage density, mismatch of working media, and being liable to cause damage to equipment. By the integration of cold storage and wastewater treatment, the energy consumed by the wastewater treatment can be fully utilized, thereby achieving energy saving, emission reduction, and multiple utilization of the energy.

SUMMARY

The technical problem to be solved by the present disclosure is to overcome the deficiencies of complex process, selectivity to the types of pollutants, high treatment difficulty, and high energy consumption in the existing wastewater treatment systems, and the deficiencies of slow hydrate nucleation and low energy storage conversion rate in the existing cold storage systems, and provide a system and an apparatus for hydrate-based wastewater treatment and cold storage.

To solve the above technical problems, the following technical solutions are employed in the present disclosure. The present disclosure provides an apparatus for hydrate-based wastewater treatment and cold storage, including a water chilling unit, a heat exchange system, a finned tube heat exchanger, a first two-way valve, a second two-way valve, a system monitoring device, a wastewater tank, a spraying device, a wastewater treatment and cold storage tank, a water layer positioning device, a return tank, a temperature sensor group, an evaporator coil, a first branch pipeline, a second branch pipeline, a third branch pipeline, a fourth branch pipeline, a fifth branch pipeline, a sixth branch pipeline, a seventh branch pipeline, a filter screen disc, and an eighth branch pipeline, the finned tube heat exchanger is arranged in the heat exchange system;

an outlet end of the water chilling unit is connected to an inlet of the finned tube heat exchanger through the first branch pipeline, and an inlet end of the water chilling unit is connected to an outlet of the finned tube heat exchanger through the fourth branch pipeline; a first solution pump, a first flow meter, a first one-way valve, a second one-way valve, and a second solution pump are sequentially arranged on the first branch pipeline along a flow direction of a secondary refrigerant; a third one-way valve, a fourth one-way valve, and a second flow meter are sequentially arranged on the fourth branch pipeline along the flow direction of the secondary refrigerant;

the wastewater treatment and cold storage tank is a double-layer sealed container, a first air pump is arranged at an upper end of an outer wall of the wastewater treatment and cold storage tank, a concentrated wastewater discharge pipe is arranged at a lower end of the outer wall of the wastewater treatment and cold storage tank, a fifth one-way valve is arranged on the concentrated wastewater discharge pipe, the spraying device and a two-way air valve are arranged at a top of an inner tank of the wastewater treatment and cold storage tank, the filter screen disc is arranged at a lower portion of the inner tank of the wastewater treatment and cold storage tank, a gas generator is arranged on an upper side of a surface of the filter screen disc, and the gas generator is connected to a second air pump; a bottom of the inner tank of the wastewater treatment and cold storage tank is ellipsoidally depressed, and is provided with a solid-liquid separation switch, and a sealing ring is sleeved over a periphery of the solid-liquid separation switch;

the evaporator coil is located at a center of the inner tank of the wastewater treatment and cold storage tank, the inner tank of the wastewater treatment and cold storage tank is filled with a hydrate former, the temperature sensor group and the water layer positioning device are arranged in the wastewater treatment and cold storage tank, and a terminal of the temperature sensor group and a terminal of the water layer positioning device are connected to the system monitoring device; the first branch pipeline between the first one-way valve and the second one-way valve is connected to a first end of the evaporator coil through the second branch pipeline, the fourth branch pipeline between the third one-way valve and the fourth one-way valve is connected to a second end of the evaporator coil through the third branch pipeline, the second two-way valve is arranged on the second branch pipeline, and the first two-way valve is arranged on the third branch pipeline;

the fifth branch pipeline, the sixth branch pipeline, and the eighth branch pipeline are arranged outside the wastewater treatment and cold storage tank, an upper end of the fifth branch pipeline is communicated with the wastewater tank, and a lower end of the fifth branch pipeline is communicated with the top of the inner tank of the wastewater treatment and cold storage tank; the spraying device is sequentially connected to a sixth one-way valve, the sixth branch pipeline, a seventh one-way valve, and a third solution pump to be communicated with the return tank, and is configured to spray water in the return tank into the inner tank of the wastewater treatment and cold storage tank; the sixth branch pipeline is additionally connected to the eighth branch pipeline, and the eighth branch pipeline is sequentially connected to an eighth one-way valve and a fourth solution pump to be communicated with the return tank; the sixth branch pipeline is additionally connected to the seventh branch pipeline, and the seventh branch pipeline is sequentially connected to a ninth one-way valve and a telescopic pipe; and the telescopic pipe extends into the inner tank of the wastewater treatment and cold storage tank, and is configured to draw water formed from a hydrate decomposition back to the return tank.

Further, the temperature sensor group includes a first temperature sensor, a second temperature sensor, a third temperature sensor, a fourth temperature sensor, and a fifth temperature sensor; the first temperature sensor is arranged on the third branch pipeline and is located on a side close to the evaporator coil; the second temperature sensor is located at a central position of the inner tank of the wastewater treatment and cold storage tank; the third temperature sensor is mounted in the inner tank of the wastewater treatment and cold storage tank close to a wall surface of the inner tank of the wastewater treatment and cold storage tank; the fourth temperature sensor is mounted in a middle of the air thermal insulation layer; and the fifth temperature sensor is arranged on the second branch pipeline and is located on a side close to the evaporator coil, and the first temperature sensor, the second temperature sensor, the third temperature sensor, the fourth temperature sensor, and the fifth temperature sensor are each connected to the system monitoring device through a temperature-pressure sensor module.

Further, the apparatus for hydrate-based wastewater treatment and cold storage further includes a first pressure sensor and a second pressure sensor, where the first pressure sensor is arranged on the third branch pipeline and is located on a side close to the evaporator coil; the second pressure sensor is arranged on the second branch pipeline and is located on a side close to the evaporator coil; and the first pressure sensor and the second pressure sensor are each connected to the system monitoring device through a temperature-pressure sensor module.

Further, the telescopic pipe is positioned to a liquid surface separation position between the hydrate former and purified water according to feedback data from the water layer positioning device, and draws the purified water.

Further, the water layer positioning device is made of a sensor wrapped by a foam having a density between a density of the hydrate former and a density of purified water, and the sensor is connected to the system monitoring device.

Further, the wastewater treatment and cold storage tank is configured to treat one or more selected from a group consisting of wastewater containing heavy metals, organic wastewater, and seawater.

Preferably, the hydrate former is one selected from a group consisting of R141b, $CO_2$, and other substances that are immiscible with water or that are easily separated from water.

Preferably, an air thermal insulation layer is arranged between an outer shell of the wastewater treatment and cold storage tank and the inner tank of the wastewater treatment and cold storage tank.

The present disclosure provides a method for hydrate-based wastewater treatment and cold storage using the apparatus, including the following steps:

cold storage and wastewater treatment stage: the solid-liquid separation switch being in a closed state, wastewater flowing from the wastewater tank into the inner tank of the wastewater treatment and cold storage tank through a tenth one-way valve, the water chilling unit providing the secondary refrigerant at a low temperature, and the secondary refrigerant being conveyed by the first solution pump to the wastewater treatment and cold storage tank through the first flow meter, the first one-way valve, and the second two-way valve, and exchanging heat with a mixture of the hydrate former and the wastewater through the evaporator coil for a heat exchange, so that a hydrate is formed and the wastewater is concentrated to obtain concentrated wastewater; after the heat exchange is completed, the secondary refrigerant flowing back to the water chilling unit through the first two-way valve, the fourth one-way valve, and the second flow meter, and being cooled again to complete a wastewater treatment and cold storage cycle; after the wastewater treatment and cold storage cycle starts, the second air pump conveying air outside the apparatus into the gas generator for continuous airflow disturbance in the inner tank of the wastewater treatment and cold storage tank, and the air being discharged from the two-way air valve after the continuous airflow disturbance is completed; the system monitoring device monitoring a temperature change before and after heat absorption of the secondary refrigerant and a temperature change in a working medium for the hydrate-based wastewater treatment and cold storage and the wastewater treatment and cold storage tank in real time;

wastewater separation stage: the water chilling unit continuing to operate, the solid-liquid separation switch being raised, the concentrated wastewater flowing into the air thermal insulation layer through the filter screen disc, the fifth one-way valve being opened after wastewater separation is completed, and the fifth one-way valve being closed after the concentrated wastewater is discharged through the concentrated wastewater discharge pipe; after the wastewater separation stage starts, the two-way air valve, the first air pump, and the third solution pump being opened, and air flowing from an outside into the inner tank of the wastewater treatment and cold storage tank through the two-way air valve, entering the air thermal insulation layer through the solid-liquid separation switch, and then being discharged through the first air pump, to complete a suction filtration cycle, and improve a solid-liquid separation efficiency; purified water in the return tank being pumped into the spraying device through the third solution pump for a washing operation to improve a pollutant removal efficiency, during which the ninth one-way valve and the eighth one-way valve are closed; after the suction filtration cycle and the washing operation are completed, the two-way air valve, the first air pump, and the third solution pump being closed, and the solid-liquid separation switch being lowered to be closed;

hydrate decomposition stage: the secondary refrigerant in the wastewater treatment and cold storage tank being pumped by the second solution pump to the finned tube heat exchanger through the second one-way valve and the second two-way valve, fully absorbing heat in the finned tube heat exchanger through the heat exchange system, then flowing back to the wastewater treatment and cold storage tank through the third one-way valve and the first two-way valve, and being cooled through a heat exchange with the hydrate at a low temperature in the evaporator coil to complete a heat exchange cycle; and water recovery stage: after the hydrate is completely decomposed, the water layer positioning device positioning a contact surface between the hydrate former and the purified water, a length of the telescopic pipe being changed to a liquid surface separation position between the hydrate former and the purified water, the fourth solution pump being turned on, the purified water being drawn into the return tank and then flowing out of the apparatus from a treated water discharge pipe, during which the seventh one-way valve is closed, and after the purified water is completely recovered, a remaining part of the purified water being stored in the return tank for use in a next washing.

The present disclosure has the following advantages. Bubbles are generated by the gas generator at the bottom of the inner tank of the wastewater treatment and cold storage tank for continuous airflow disturbance on the mixture of the hydrate former and the wastewater in the wastewater treatment and cold storage tank, so as to induce the hydrate nucleation and increase the energy storage efficiency. The energy storage conversion rate and the cooling capacity are improved by the evaporator coil in the inner tank of the wastewater treatment and cold storage tank and the finned tube heat exchanger in the heat exchange system. The air thermal insulation layer between the inner tank of the wastewater treatment and cold storage tank and the outer shell of the wastewater treatment and cold storage tank reduces the heat exchange between the wastewater treatment and cold storage tank and the external environment, thereby reducing the extra consumption of electric energy in the cold storage process, and improving the cost-effectiveness. Air in the air thermal insulation layer is extracted by the air pump, so that a pressure difference is formed between the inner tank of the wastewater treatment and cold storage tank and the air thermal insulation layer, to accelerate the solid-liquid separation to achieve a suction filtration effect. The purified water in the return tank is drawn by the solution pump, and is sprayed out by the spraying device in the solid-liquid separation stage of the hydrate and the wastewater to wash the hydrate solids and remove pollutants attached to the surface of the hydrate, thereby further improving the pollutant removal efficiency. Meanwhile, since the temperature is above zero when the hydrate is formed, the washing water can smoothly flow down, and a part of the purified water formed through the treatment is left in the return tank after the wastewater treatment and cold storage cycle is completed. The position of the water layer is precisely positioned by the water layer positioning device with the density between the density of the hydrate former and the density of purified water, so that the purified water is drawn without taking away the hydrate former, thereby realizing the recycling of the hydrate former without causing secondary pollution.

The present disclosure provides a complete system for hydrate-based wastewater treatment and cold storage. The water chilling unit implements the cold storage and wastewater treatment during a low electricity price period, and discharges high-concentration wastewater. During a high electricity price period, the wastewater treatment and cold storage tank supplies cold energy to the heat exchange system, and purified water is separated and discharged. To sum up, according to the present disclosure, latent heat during phase change of the clathrate hydrate and an exclusive effect that wastewater only reacts with a specific hydrate former to form the hydrate are fully utilized for cold storage and wastewater treatment. The present disclosure has the advantages of high efficiency, energy saving, and no selectivity to wastewater types, and is especially suitable for scenarios where wastewater is formed and cold energy supply is required.

DETAILED DESCRIPTION OF THE EMBODIMENTS

The present disclosure will be further described in detail below with reference to specific examples and the accompanying drawings.

Figure 1:
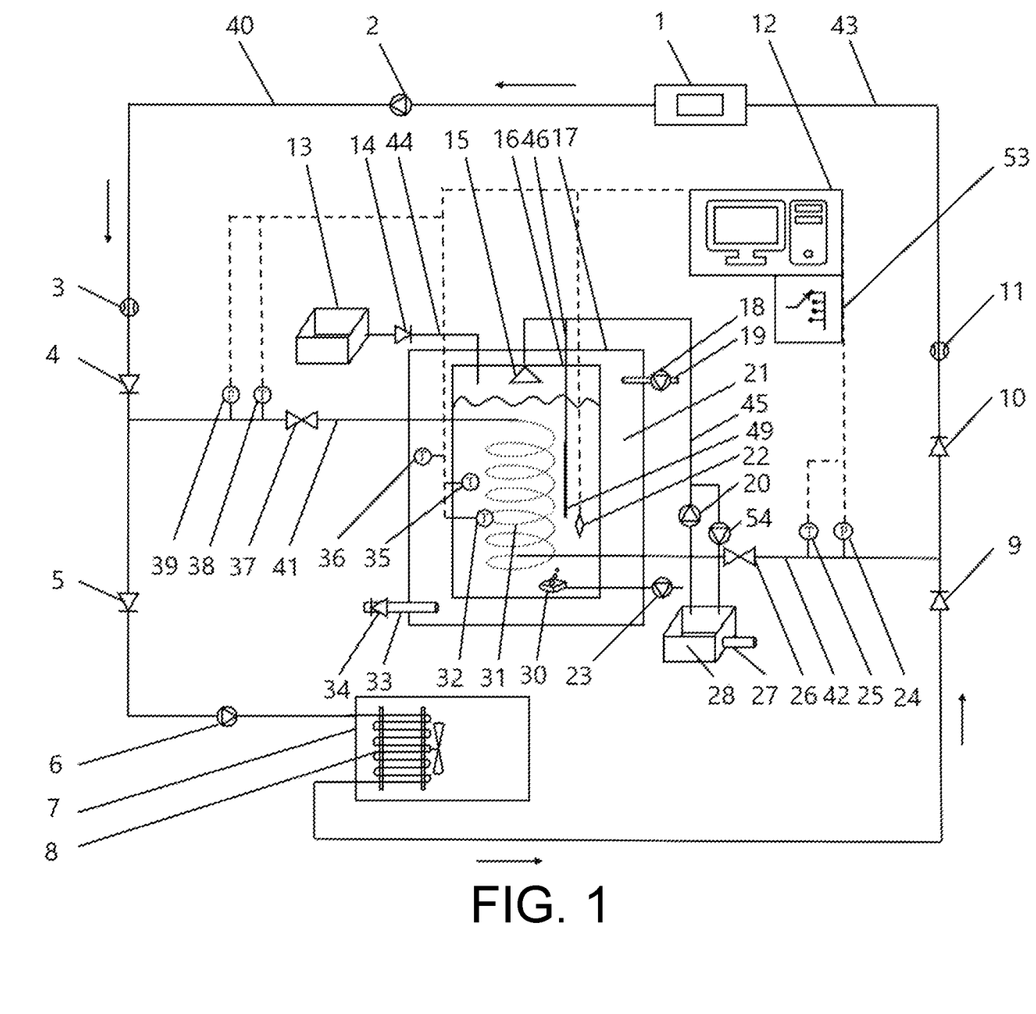
FIG. 1 is a schematic structural diagram of the present disclosure.
Figure 2:
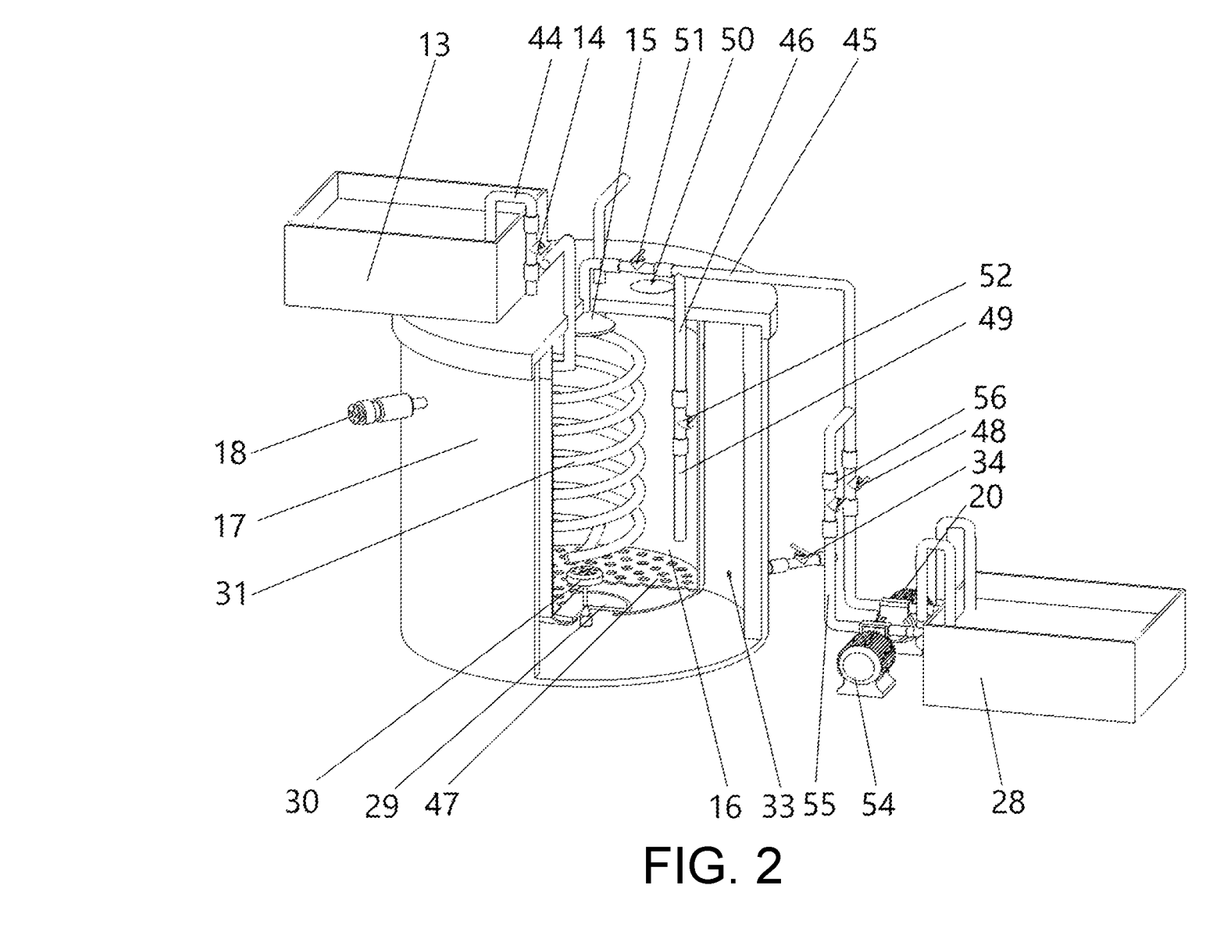
FIG. 2 is an overall schematic structural diagram of an apparatus according to the present disclosure.
Figure 3:
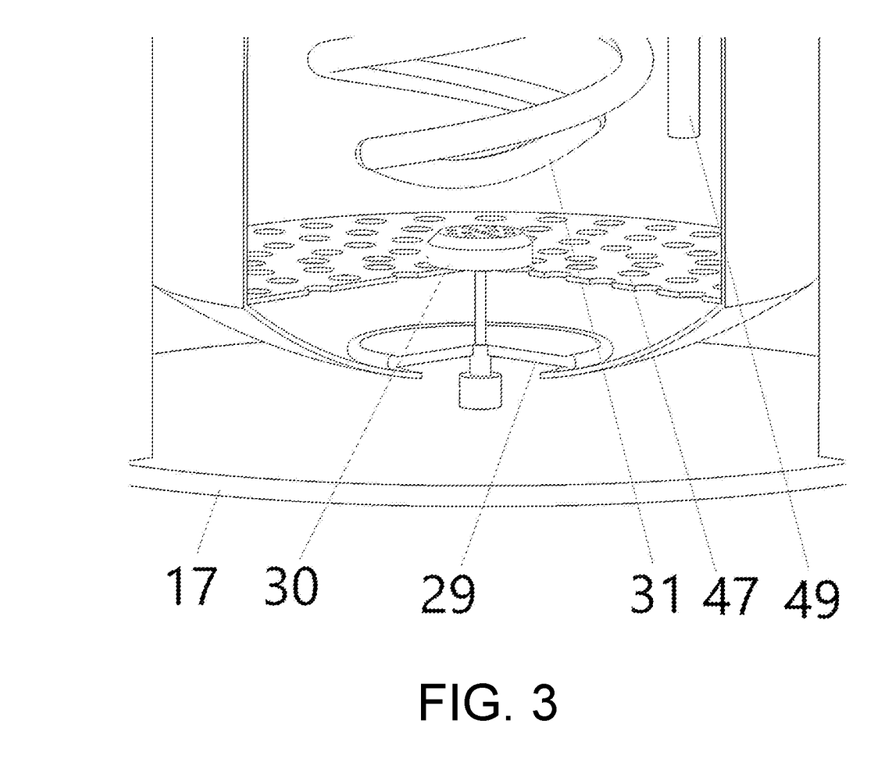
FIG. 3 is a partial schematic structural diagram of the apparatus according to the present disclosure.

Example 1: Referring to FIG. 1 to FIG. 3, the present disclosure provides an apparatus for hydrate-based wastewater treatment and cold storage, including a water chilling unit 1, a heat exchange system 7, a finned tube heat exchanger 8, a first two-way valve 26, a second two-way valve 37, a system monitoring device 12, a wastewater tank 13, a spraying device 15, a wastewater treatment and cold storage tank 17, a water layer positioning device 22, a return tank 28, a temperature sensor group, an evaporator coil 31, a first branch pipeline 40, a second branch pipeline 41, a third branch pipeline 42, a fourth branch pipeline 43, a fifth branch pipeline 44, a sixth branch pipeline 45, a seventh branch pipeline 46, a filter screen disc 47, and an eighth branch pipeline 55.

The wastewater treatment and cold storage tank 17 is a double-layer sealed container. An inner tank 16 of the wastewater treatment and cold storage tank is filled with a hydrate former. Dimensions of the wastewater treatment and cold storage tank 17 are preferably as follows: the outer shell has a diameter of 3.2 m and a height of 5 m and the inner tank has a diameter of 3 m and a height of 4 m. A lower side of the inner tank is provided with a slightly ellipsoidal depression structure having a top height of 0.2 m, and a diameter of an opening at a bottom of the inner tank is 1.5 m. The solid-liquid separation device has a diameter of 1.6 m. The mixture of the hydrate former and the wastewater occupies 9/10 of the space in the inner tank 16 of the wastewater treatment and cold storage tank. The evaporator coil 31 is arranged in the inner tank 16 of the wastewater treatment and cold storage tank and is completely immersed in the mixture of the hydrate former and the wastewater. The temperature sensor group is arranged in the inner tank 16 of the wastewater treatment and cold storage tank and in the air thermal insulation layer 21. A terminal of the temperature sensor group is connected to the system monitoring device 12. The finned tube heat exchanger 8 is arranged in the heat exchange system 7.

An outlet end of the water chilling unit 1 is connected to an inlet of the finned tube heat exchanger 8 through the first branch pipeline 40, and an inlet end of the water chilling unit is connected to an outlet of the finned tube heat exchanger 8 through the fourth branch pipeline 43. A first solution pump 2, a first flow meter 3, a first one-way valve 4, a second one-way valve 5, and a second solution pump 6 are sequentially arranged on the first branch pipeline 40 along a flow direction of a secondary refrigerant. A third one-way valve 9, a fourth one-way valve 10, and a second flow meter 11 are sequentially arranged on the fourth branch pipeline 43 along the flow direction of the secondary refrigerant. A first air pump 18 is arranged at an upper end of an outer wall of the wastewater treatment and cold storage tank 17. A concentrated wastewater discharge pipe 33 is arranged at a lower end of the outer wall of the wastewater treatment and cold storage tank 17. A fifth one-way valve 34 is arranged on the concentrated wastewater discharge pipe 33. The spraying device 15 and a two-way air valve 50 are arranged at a top of an inner tank 16 of the wastewater treatment and cold storage tank. The filter screen disc 47 is arranged at a lower portion of the inner tank 16 of the wastewater treatment and cold storage tank. A gas generator 30 is arranged on an upper side of a surface of the filter screen disc 47. The gas generator 30 is connected to a second air pump 23. A bottom of the inner tank 16 of the wastewater treatment and cold storage tank is ellipsoidally depressed, and is provided with a solid-liquid separation switch 29. A sealing ring is sleeved over a periphery of the solid-liquid separation switch 29.

The evaporator coil 31 is located at a center of the inner tank 16 of the wastewater treatment and cold storage tank. The inner tank 16 of the wastewater treatment and cold storage tank is filled with a hydrate former. The temperature sensor group and the water layer positioning device 22 are arranged in the wastewater treatment and cold storage tank 17. A terminal of the temperature sensor group and a terminal of the water layer positioning device 22 are connected to the system monitoring device 12. The first branch pipeline 40 between the first one-way valve 4 and the second one-way valve 5 is connected to a first end of the evaporator coil 31 through the second branch pipeline 41. The fourth branch pipeline 43 between the third one-way valve 9 and the fourth one-way valve 10 is connected to a second end of the evaporator coil 31 through the third branch pipeline 42. The second two-way valve 37 is arranged on the second branch pipeline 41. The first two-way valve 26 is arranged on the third branch pipeline 42.

The fifth branch pipeline 44, the sixth branch pipeline 45, and the eighth branch pipeline 55 are arranged outside the wastewater treatment and cold storage tank 17. An upper end of the fifth branch pipeline 44 is communicated with the wastewater tank 13. A lower end of the fifth branch pipeline 44 is communicated with the top of the inner tank 16 of the wastewater treatment and cold storage tank. The spraying device 15 is sequentially connected to a sixth one-way valve 51, the sixth branch pipeline 45, a seventh one-way valve 48, and a third solution pump 20 to be communicated with the return tank 28, and is configured to spray water in the return tank into the inner tank 16 of the wastewater treatment and cold storage tank. The sixth branch pipeline 45 is additionally connected to the eighth branch pipeline 55, and the eighth branch pipeline 55 is sequentially connected to an eighth one-way valve 56 and a fourth solution pump 54 to be communicated with the return tank 28. The sixth branch pipeline 45 is additionally connected to the seventh branch pipeline 46, and the seventh branch pipeline 46 is sequentially connected to a ninth one-way valve 52 and a telescopic pipe 49. The telescopic pipe 49 extends into the inner tank 16 of the wastewater treatment and cold storage tank, and is configured to draw water formed from the hydrate decomposition back to the return tank 28.

When the wastewater treatment and cold storage tank 17 needs to perform cold storage and wastewater treatment, the wastewater enters the inner tank 16 from the wastewater tank 13 through the branch pipeline 44, and the secondary refrigerant is conveyed to the wastewater treatment and cold storage tank 17 by the first solution pump 2, and exchanges heat with the mixture of the hydrate former and the wastewater through the evaporator coil 31, to fully absorb heat of the inner tank 16 of the wastewater treatment and cold storage tank, thereby realizing energy storage and wastewater treatment through phase change of the hydrate. After the heat exchange is completed, the secondary refrigerant flows back to the water chilling unit 1 to be cooled again to complete a cold storage and wastewater treatment cycle. Preferably, the water chilling unit is a single-working-condition water chilling unit. Preferably, the secondary refrigerant is an ethylene glycol aqueous solution with a concentration of 30%. Preferably, the hydrate former is R141b. Preferably, a volume ratio of the hydrate former to the wastewater is 1:4.

After the cold storage and wastewater treatment is completed, the water chilling unit 1 continues to operate, to reduce hydrate decomposition. The solid-liquid separation switch 29 is raised, and the concentrated wastewater flows into the air thermal insulation layer 21 through a gauze on the filter screen disc 47. After wastewater separation is completed, the concentrated wastewater is discharged through the concentrated wastewater discharge pipe 33. Small holes on the filter screen disc preferably have a diameter of 5 cm. The gauze is preferably 50 mesh.

When the wastewater treatment and cold storage tank 17 needs to supply cold energy, the solid-liquid separation switch 29 is lowered. A direct-current power supply and circuit control system 53 for controlling the system power supply is located in the system for hydrate-based wastewater treatment and cold storage. The finned tube heat exchanger 8 is arranged in the heat exchange system 7. The secondary refrigerant in the wastewater treatment and cold storage tank 17 is pumped by the second solution pump 6 to the finned tube heat exchanger 8 sequentially through the second two-way valve 37 and the second one-way valve 5, fully absorbs heat in the finned tube heat exchanger 8 through the heat exchange system 7, then flows back to the wastewater treatment and cold storage tank 17 through the third one-way valve 9 and the first two-way valve 26, and is cooled again through a heat exchange with the hydrate at a low temperature in the evaporator coil 31 to complete a cold energy supply cycle. Meanwhile, the hydrate in the inner tank 16 of the wastewater treatment and cold storage tank is decomposed into the hydrate former and purified water.

The gas generator is located at a bottom of the evaporator coil 31 and above the filter screen disc 47. When the wastewater treatment and cold storage tank 17 needs to perform cold storage and wastewater treatment, the two-way air valve 50 is opened, the gas generator 30 operates, and air outside wastewater treatment and cold storage tank 17 is pumped by the second air pump 23, is released from the bottom of the evaporator coil 31 and flows out of the two-way air valve 50. The mixture of the hydrate former and the wastewater is continuously disturbed to promote the hydrate formation. In this way, the randomness of hydrate formation is reduced, the formed hydrate is flocculent, and the solid-liquid separation efficiency is enhanced.

The spraying device is connected to the return tank 28 through the sixth branch pipeline 45. The third solution pump 20, the seventh one-way valve 48, and the sixth one-way valve 51 are sequentially arranged on the sixth branch pipeline 45 along a flow direction of the washing water. The spraying device 15 is located above an inner side of the inner tank 16 of the wastewater treatment and cold storage tank. After the cold storage and wastewater treatment process is completed, the solid-liquid separation switch 29 is raised. When the concentrated wastewater is discharged, the spraying device 15 draws the purified water left in the previous cycle from the return tank 28 to continuously wash the hydrate solids, thereby reducing high-concentration wastewater remaining among the hydrate solids. In this case, the ninth one-way valve 52 and the eighth one-way valve 56 are closed.

The air pump is located on a side surface of the wastewater treatment and cold storage tank 17. After the cold storage and wastewater treatment process is completed, the solid-liquid separation switch 29 is raised. When the concentrated wastewater is discharged, the two-way air valve 50 is opened, and the first air pump 18 operates to extract air in the air thermal insulation layer 21, so as to form a pressure difference between two sides of the filter screen disc 47 to accelerate the separation of the high-concentration wastewater from the hydrate solids.

The ninth one-way valve 52 is arranged on the water layer positioning device 22. One end of the water layer positioning device 22 is connected to the seventh branch pipeline 46. The water layer positioning device 22 is made of a sensor wrapped by a foam having a density between a density of the hydrate former and a density of purified water. After the cold energy supply is completed, the water layer positioning device 22 positions the position of the water layer, the telescopic pipe 22 is moved to above the water layer, the fourth solution pump 54 operates, and purified water flows out of the apparatus from a treated water discharge pipe 27 after passing through the ninth one-way valve 52, the eighth one-way valve 56, and the return tank 28. A small volume of purified water is always stored in the return tank 28 for use by the spraying device 15 in a next cycle. The volume of water left in the return tank is preferably 5% of a wastewater treatment volume.

The temperature sensor group includes a second temperature sensor 32, a third temperature sensor 35, and a fourth temperature sensor 36. The fourth temperature sensor 36 is mounted in a middle of the air thermal insulation layer 21. The third temperature sensor 35 is mounted in the inner tank 16 of the wastewater treatment and cold storage tank close to a wall surface of the inner tank 16 of the wastewater treatment and cold storage tank. The second temperature sensor 32 is located at a central position of the inner tank 16 of the wastewater treatment and cold storage tank. The first temperature sensor 25, the fifth temperature sensor 38, the first pressure sensor 24, the second pressure sensor 39, and the temperature sensor group are each connected to the system monitoring device 12 through a temperature-pressure sensor module. The system monitoring device 12 monitors a state in the wastewater treatment and cold storage tank 17 by the second temperature sensor 32, the third temperature sensor 35, and the fourth temperature sensor 36, and monitors temperature and pressure changes of the secondary refrigerant before and after passing through the wastewater treatment and cold storage tank 17 by the first temperature sensor 25, the fifth temperature sensor 38, the first pressure sensor 24, and the second pressure sensor 39.

Specifically, a method of operating the apparatus for hydrate-based wastewater treatment and cold storage includes the following steps.

Cold storage and wastewater treatment stage: The solid-liquid separation switch 29 is in a closed state, wastewater flows from the wastewater tank 13 into the inner tank 16 of the wastewater treatment and cold storage tank through a tenth one-way valve 14, the water chilling unit 1 provides the secondary refrigerant at a low temperature, and the secondary refrigerant is conveyed by the first solution pump 2 to the wastewater treatment and cold storage tank 17 through the first flow meter 3, the first one-way valve 4, and the second two-way valve 37, and exchanges heat with a mixture of the hydrate former and the wastewater through the evaporator coil 31 for a heat exchange, so that a hydrate is formed and the wastewater is concentrated to obtain concentrated wastewater. After the heat exchange is completed, the secondary refrigerant flows back to the water chilling unit 1 through the first two-way valve 26, the fourth one-way valve 10, and the second flow meter 11, and is cooled again to complete a wastewater treatment and cold storage cycle. After the wastewater treatment and cold storage cycle starts, the second air pump 23 conveys air outside the apparatus into the gas generator 30 for continuous airflow disturbance in the inner tank 16 of the wastewater treatment and cold storage tank, and the air is discharged from the two-way air valve 50 after the continuous airflow disturbance is completed. The system monitoring device 12 monitors a temperature change before and after heat absorption of the secondary refrigerant and a temperature change in a working medium for the hydrate-based wastewater treatment and cold storage and the wastewater treatment and cold storage tank in real time.

Wastewater separation stage: The water chilling unit 1 continues to operate, the solid-liquid separation switch 29 is raised, the concentrated wastewater flows into the air thermal insulation layer 21 through the filter screen disc 47, the fifth one-way valve 34 is opened after wastewater separation is completed, and the fifth one-way valve 34 is closed after the concentrated wastewater is discharged through the concentrated wastewater discharge pipe 33. After the wastewater separation stage starts, the two-way air valve 50, the first air pump 18, and the third solution pump 20 are opened, and air flows from the outside into the inner tank 16 of the wastewater treatment and cold storage tank through the two-way air valve 50, enters the air thermal insulation layer 21 through the solid-liquid separation switch 29, and then is discharged through the first air pump 18, to complete a suction filtration cycle, and improve the solid-liquid separation efficiency. Purified water in the return tank 28 is pumped into the spraying device 15 through the third solution pump 20 for a washing operation to improve the pollutant removal efficiency, during which the ninth one-way valve 52 and the eighth one-way valve 56 are closed. After the suction filtration cycle and the washing operation are completed, the two-way air valve 50, the first air pump 18, and the third solution pump 20 are closed, and the solid-liquid separation switch 29 is lowered to be closed.

Hydrate decomposition stage: The secondary refrigerant in the wastewater treatment and cold storage tank 17 is pumped by the second solution pump 6 to the finned tube heat exchanger 8 through the second two-way valve 37 and the second one-way valve 5, fully absorbs heat in the finned tube heat exchanger 8 through the heat exchange system 7, then flows back to the wastewater treatment and cold storage tank 17 through the third one-way valve 9 and the first two-way valve 26, and is cooled through a heat exchange with the hydrate at a low temperature in the evaporator coil 31 to complete a heat exchange cycle.

Water recovery stage: After the hydrate is completely decomposed, the water layer positioning device 22 positions a contact surface between the hydrate former and the purified water, a length of the telescopic pipe 49 is changed to a liquid surface separation position between the hydrate former and the purified water, the fourth solution pump 54 is turned on, the purified water is drawn into the return tank 28 and then flows out of the apparatus from a treated water discharge pipe 27, during which the seventh one-way valve 48 is closed, and after the purified water is completely recovered, a remaining part of the purified water is stored in the return tank 28 for use in a next washing.

What is claimed is:

1. An apparatus for hydrate-based wastewater treatment and cold storage, comprising a water chilling unit, a heat exchange system, a finned tube heat exchanger, a first two-way valve, a second two-way valve, a system monitoring device, a wastewater tank, a spraying device, a wastewater treatment and cold storage tank, a water layer positioning device, a return tank, a temperature sensor group, an evaporator coil, a first branch pipeline, a second branch pipeline, a third branch pipeline, a fourth branch pipeline, a fifth branch pipeline, a sixth branch pipeline, a seventh branch pipeline, a filter screen disc, and an eighth branch pipeline, wherein the finned tube heat exchanger is arranged in the heat exchange system;

an outlet end of the water chilling unit is connected to an inlet of the finned tube heat exchanger through the first branch pipeline, and an inlet end of the water chilling unit is connected to an outlet of the finned tube heat exchanger through the fourth branch pipeline; a first solution pump, a first flow meter, a first one-way valve, a second one-way valve, and a second solution pump are sequentially arranged on the first branch pipeline along a flow direction of a secondary refrigerant; a third one-way valve, a fourth one-way valve, and a second flow meter are sequentially arranged on the fourth branch pipeline along the flow direction of the secondary refrigerant;

the wastewater treatment and cold storage tank is a double-layer sealed container, a first air pump is arranged at an upper end of an outer wall of the wastewater treatment and cold storage tank, a concentrated wastewater discharge pipe is arranged at a lower end of the outer wall of the wastewater treatment and cold storage tank, a fifth one-way valve is arranged on the concentrated wastewater discharge pipe, the spraying device and a two-way air valve are arranged at a top of an inner tank of the wastewater treatment and cold storage tank, the filter screen disc is arranged at a lower portion of the inner tank of the wastewater treatment and cold storage tank, a gas generator is arranged on an upper side of a surface of the filter screen disc, and the gas generator is connected to a second air pump; a bottom of the inner tank of the wastewater treatment and cold storage tank is ellipsoidally depressed, and is provided with a solid-liquid separation switch, and a sealing ring is sleeved over a periphery of the solid-liquid separation switch;

the evaporator coil is located at a center of the inner tank of the wastewater treatment and cold storage tank, the inner tank of the wastewater treatment and cold storage tank is filled with a hydrate former, the temperature sensor group and the water layer positioning device are arranged in the wastewater treatment and cold storage tank, and a terminal of the temperature sensor group and a terminal of the water layer positioning device are connected to the system monitoring device; the first branch pipeline between the first one-way valve and the second one-way valve is connected to a first end of the evaporator coil through the second branch pipeline, the fourth branch pipeline between the third one-way valve and the fourth one-way valve is connected to a second end of the evaporator coil through the third branch pipeline, the second two-way valve is arranged on the second branch pipeline, and the first two-way valve is arranged on the third branch pipeline;

the fifth branch pipeline, the sixth branch pipeline, and the eighth branch pipeline are arranged outside the wastewater treatment and cold storage tank, an upper end of the fifth branch pipeline is in communication with the wastewater tank, and a lower end of the fifth branch pipeline is in communication with the top of the inner tank of the wastewater treatment and cold storage tank; the spraying device is sequentially connected to a sixth one-way valve, the sixth branch pipeline, a seventh one-way valve, and a third solution pump to be in communication with the return tank, and is configured to spray water in the return tank into the inner tank of the wastewater treatment and cold storage tank; the sixth branch pipeline is additionally connected to the eighth branch pipeline, and the eighth branch pipeline is sequentially connected to an eighth one-way valve and a fourth solution pump to be in communication with the return tank; the sixth branch pipeline is additionally connected to the seventh branch pipeline, and the seventh branch pipeline is sequentially connected to a ninth one-way valve and a telescopic pipe; the telescopic pipe extends into the inner tank of the wastewater treatment and cold storage tank, and is configured to draw water formed from a hydrate decomposition back to the return tank; and an air thermal insulation layer is arranged between an outer shell of the wastewater treatment and cold storage tank and the inner tank of the wastewater treatment and cold storage tank.

2. The apparatus for hydrate-based wastewater treatment and cold storage according to claim 1, wherein the temperature sensor group comprises a first temperature sensor, a second temperature sensor, a third temperature sensor, a fourth temperature sensor, and a fifth temperature sensor; wherein the first temperature sensor is arranged on the third branch pipeline and is located on a side close to the evaporator coil; the second temperature sensor is located at a central position of the inner tank of the wastewater treatment and cold storage tank; the third temperature sensor is mounted in the inner tank of the wastewater treatment and cold storage tank and close to a wall surface of the inner tank of the wastewater treatment and cold storage tank; the fourth temperature sensor is mounted in a middle of the air thermal insulation layer; and the fifth temperature sensor is arranged on the second branch pipeline and is located on a side close to the evaporator coil, and the first temperature sensor, the second temperature sensor, the third temperature sensor, the fourth temperature sensor, and the fifth temperature sensor are each connected to the system monitoring device through a temperature-pressure sensor module.

3. The apparatus for hydrate-based wastewater treatment and cold storage according to claim 1, further comprising a first pressure sensor and a second pressure sensor, wherein the first pressure sensor is arranged on the third branch pipeline and is located on a side close to the evaporator coil; the second pressure sensor is arranged on the second branch pipeline and is located on a side close to the evaporator coil; and the first pressure sensor and the second pressure sensor are each connected to the system monitoring device through a temperature-pressure sensor module.

4. The apparatus for hydrate-based wastewater treatment and cold storage according to claim 1, wherein the telescopic pipe is positioned adjacent to a liquid surface separation position between the hydrate former and purified water according to feedback data from the water layer positioning device, and draws the purified water.

5. The apparatus for hydrate-based wastewater treatment and cold storage according to claim 1, wherein the water layer positioning device is made of a sensor wrapped by a foam having a density between a density of the hydrate former and a density of purified water, and the sensor is connected to the system monitoring device.

6. The apparatus for hydrate-based wastewater treatment and cold storage according to claim 1, wherein the wastewater treatment and cold storage tank is configured to treat one or more selected from a group consisting of wastewater containing heavy metals, organic wastewater, and seawater.

7. The apparatus for hydrate-based wastewater treatment and cold storage according to claim 1, wherein the hydrate former is one selected from a group consisting of R141b and $CO_2$.

8. A method for hydrate-based wastewater treatment and cold storage using the apparatus according to claim 1, comprising the following steps:
   cold storage and wastewater treatment stage: the solid-liquid separation switch being in a closed state, wastewater flowing from the wastewater tank into the inner tank of the wastewater treatment and cold storage tank through a tenth one-way valve, the water chilling unit providing the secondary refrigerant at a low temperature, and the secondary refrigerant being conveyed by the first solution pump to the wastewater treatment and cold storage tank through the first flow meter, the first one-way valve, and the second two-way valve, and exchanging heat with a mixture of the hydrate former and the wastewater through the evaporator coil for a heat exchange, so that a hydrate is formed and the wastewater is concentrated to obtain concentrated wastewater; after the heat exchange being completed, the secondary refrigerant flowing back to the water chilling unit through the first two-way valve, the fourth one-way valve, and the second flow meter, and being cooled again to complete a wastewater treatment and cold storage cycle; after the wastewater treatment and cold storage cycle starting, the second air pump conveying air outside the apparatus into the gas generator for continuous airflow disturbance in the inner tank of the wastewater treatment and cold storage tank, and the air being discharged from the two-way air valve after the continuous airflow disturbance being completed; the system monitoring device monitoring a temperature change before and after heat absorption of the secondary refrigerant and a temperature change in a working medium for the hydrate-based wastewater treatment and cold storage and the wastewater treatment and cold storage tank in real time;
   wastewater separation stage: the water chilling unit continuing to operate, the solid-liquid separation switch being raised, the concentrated wastewater flowing into the air thermal insulation layer through the filter screen disc, the fifth one-way valve being opened after wastewater separation being completed, and the fifth one-way valve being closed after the concentrated wastewater being discharged through the concentrated wastewater discharge pipe; after the wastewater separation stage starting, the two-way air valve, the first air pump, and the third solution pump being opened, and air flowing from an outside into the inner tank of the wastewater treatment and cold storage tank through the two-way air valve, entering the air thermal insulation layer through the solid-liquid separation switch, and then being discharged through the first air pump, to complete a suction filtration cycle, and improve a solid-liquid separation efficiency; purified water in the return tank being pumped into the spraying device through the third solution pump for a washing operation to improve a pollutant removal efficiency, during which the ninth one-way valve and the eighth one-way valve being closed; after the suction filtration cycle and the washing operation being completed, the two-way air valve, the first air pump, and the third solution pump being closed, and the solid-liquid separation switch being lowered to be closed;
   hydrate decomposition stage: the secondary refrigerant in the wastewater treatment and cold storage tank being pumped by the second solution pump to the finned tube heat exchanger through the second two-way valve and the second one-way valve, fully absorbing heat in the finned tube heat exchanger through the heat exchange system, then flowing back to the wastewater treatment and cold storage tank through the third one-way valve and the first two-way valve, and being cooled through a heat exchange with the hydrate at a low temperature in the evaporator coil to complete a heat exchange cycle; and
   water recovery stage: after the hydrate being completely decomposed, the water layer positioning device positioning a contact surface between the hydrate former and the purified water, a length of the telescopic pipe being changed to a liquid surface separation position between the hydrate former and the purified water, the fourth solution pump being turned on, the purified water being drawn into the return tank and then flowing out of the apparatus from a treated water discharge pipe, during which the seventh one-way valve being closed, and after the purified water being completely recovered, a remaining part of the purified water being stored in the return tank for use in a next washing.

9. The method according to claim 8, wherein at the water recovery stage, the remaining part of the purified water in the return tank is for use in next washing accounts for 5% of a wastewater treatment volume.

* * * * *